(12) United States Patent
Waffenschmidt et al.

(10) Patent No.: US 9,847,665 B2
(45) Date of Patent: Dec. 19, 2017

(54) RECEIVER ELECTRODES OF A CAPACITIVE WIRELESS POWERING SYSTEM

(75) Inventors: Eberhard Waffenschmidt, Aachen (DE); Coen Theodorus Hurbertus Fransiscus Liedenbaum, Oss (NL); Adrianus Sempel, Waalre (NL); Oscar Hendrikus Willemsen, Den Bosch (NL); Dave Willem Van Goor, Nederweert eind (NL); Henricus Theodorus Van Der Zanden, Sint-Oedenrode (NL); Theodorus Johannes Petrus Van Den Biggelaar, Veldhoven (NL); Anthonie Hendrik Bergman, Nuenen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 864 days.

(21) Appl. No.: 14/237,908

(22) PCT Filed: Aug. 6, 2012

(86) PCT No.: PCT/IB2012/054004
§ 371 (c)(1),
(2), (4) Date: Feb. 10, 2014

(87) PCT Pub. No.: WO2013/024395
PCT Pub. Date: Feb. 21, 2013

(65) Prior Publication Data
US 2014/0203663 A1 Jul. 24, 2014

Related U.S. Application Data

(60) Provisional application No. 61/523,936, filed on Aug. 16, 2011, provisional application No. 61/523,960, (Continued)

(51) Int. Cl.
*H02M 3/06* (2006.01)
*H02J 7/02* (2016.01)
(Continued)

(52) U.S. Cl.
CPC .............. *H02J 7/025* (2013.01); *H02J 5/005* (2013.01); *H02J 17/00* (2013.01); *H04B 5/0012* (2013.01); *H04B 5/0037* (2013.01)

(58) Field of Classification Search
CPC ...................................................... H02J 50/05
(Continued)

(56) References Cited

U.S. PATENT DOCUMENTS 5,039,047 A 8/1991 Pitzo
5,323,099 A 6/1994 Bruni et al.
(Continued)

FOREIGN PATENT DOCUMENTS

CN 102048367 A 5/2011
EP 0676710 A1 10/1995
(Continued)

*Primary Examiner* — Rexford Barnie
*Assistant Examiner* — Dru Parries
(74) *Attorney, Agent, or Firm* — Akarsh P. Belagodu (57) ABSTRACT

Various receiver electrodes for supplying power to a load connected in a capacitive power transfer system are disclosed. In one embodiment, the receiver electrodes include a first conductive plate (212) connected to a first sphere-shaped hinge (211), wherein the first sphere-shaped hinge is coupled to a first receiver electrode (210); and a second conductive plate (222) connected to a second sphere-shaped hinge (221), wherein the second sphere-shaped hinge is coupled to a second receiver electrode (220), the second receiver electrode being connected to an inductor of the capacitive power transfer system and the first receiver
(Continued)

electrode being connected to the load, the inductor being connected to the load to resonate the capacitive power transfer system.

12 Claims, 7 Drawing Sheets

Related U.S. Application Data filed on Aug. 16, 2011, provisional application No. 61/611,687, filed on Mar. 16, 2012, provisional application No. 61/640,896, filed on May 1, 2012.

(51) Int. Cl.
  *H02J 5/00* (2016.01)
  *H02J 17/00* (2006.01)
  *H04B 5/00* (2006.01)

(58) Field of Classification Search
  USPC .................................................. 307/109, 104
  See application file for complete search history.

(56) References Cited

U.S. PATENT DOCUMENTS

| | | | |
|---|---|---|---|
| 7,026,789 B2 | 4/2006 | Bozzone et al. | |
| 7,263,885 B2 | 9/2007 | Goto | |
| 7,733,058 B2 | 6/2010 | Takaoka et al. | |
| 2007/0279002 A1 | 12/2007 | Partovi | |
| 2009/0212637 A1 | 8/2009 | Baarman et al. | |
| 2009/0237029 A1 | 9/2009 | Andelfinger | |
| 2010/0277120 A1 | 11/2010 | Cook et al. | |
| 2011/0110404 A1 | 5/2011 | Washiro | |
| 2011/0202777 A1* | 8/2011 | Hijazi | G06F 1/263 713/300 |
| 2012/0146431 A1* | 6/2012 | Ichikawa | H02J 3/00 307/149 |
| 2012/0153740 A1* | 6/2012 | Soar | F41H 1/02 307/104 |

FOREIGN PATENT DOCUMENTS

| | | |
|---|---|---|
| FR | 2875939 A1 | 3/2006 |
| JP | H09312942 A | 12/1997 |
| JP | 2010148287 A | 7/2010 |
| WO | 9728595 A1 | 8/1997 |
| WO | 2009087350 A1 | 7/2009 |
| WO | 2009089146 A1 | 7/2009 |
| WO | 2010150317 A1 | 12/2010 |
| WO | 2013024419 A2 | 2/2013 |

* cited by examiner

RECEIVER ELECTRODES OF A CAPACITIVE WIRELESS POWERING SYSTEM

This application claims priority from U.S. provisional application No. 61/523,936 filed Aug. 16, 2011, U.S. provisional application No. 61/523,960 filed Aug. 16, 2011, U.S. provisional application No. 61/611,687 filed Mar. 16, 2012 and U.S. provisional application No. 61/640,896 filed May 1, 2012.

The invention generally relates to capacitive powering systems for wireless power transfers, and more particularly to receiver electrodes structures to transfer power over a large area.

A wireless power transfer refers to the supply of electrical power without any wires or contacts, whereby the powering of electronic devices is performed through a wireless medium. One popular application for contactless powering is for the charging of portable electronic devices, e.g., mobiles phones, laptop computers, and the like.

One implementation for the wireless power transfer is by an inductive powering system. In such a system, the electromagnetic inductance between a power source (transmitter) and the device (receiver) allows for contactless power transfers. Both the transmitter and receiver are fitted with electrical coils, and when brought into physical proximity, an electrical signal flows from the transmitter to the receiver.

In inductive powering systems, the generated magnetic field is concentrated within the coils. As a result, the power transfer to the receiver pick-up field is very concentrated in space. This phenomenon creates hot-spots in the system which limits the efficiency of the system. To improve the efficiency of the power transfer, a high quality factor for each coil is needed. To this end, the coil should be characterized with an optimal ratio of an inductance to resistance, be composed of materials with low resistance, and fabricated using a Litze-wire process to reduce skin-effect. Moreover, the coils should be designed to meet complicated geometries to avoid Eddy-currents. Therefore, expensive coils are required for efficient inductive powering systems. A design for a contactless power transfer system for large areas would necessitate many expensive coils, whereby for such applications an inductive powering system may not be feasible.

Capacitive coupling is another technique for transferring power wirelessly. This technique is predominantly utilized in data transfers and sensing applications. A car-radio antenna glued on the window with a pick-up element inside the car is an example of a capacitive coupling. The capacitive coupling technique is also utilized for contactless charging of electronic devices. For such applications, the charging unit implementing the capacitive coupling operates at frequencies outside the inherent resonance frequency of the device.

Figure 1:
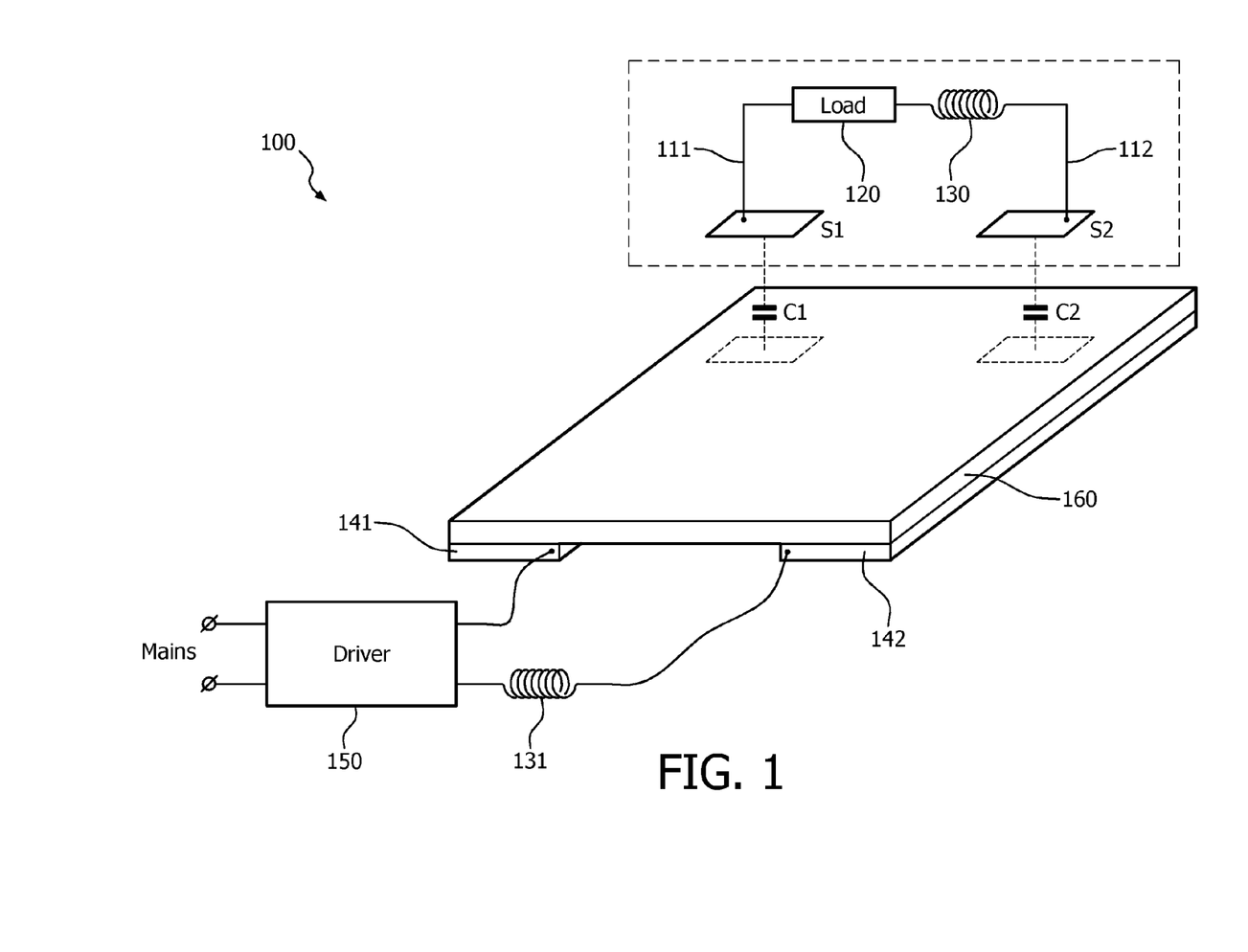
FIG. 1 is a diagram of a capacitive power system.

A capacitive power transfer system can also be utilized to transfer power over large areas, e.g., windows, walls having a flat structure and so on. An example for such a captive power transfer system 100 is depicted in FIG. 1. As illustrated in FIG. 1, a typical arrangement of such a system includes a pair of receiver electrodes 111, 112 connected to a load 120 and an inductor 130. The system 100 also includes a pair of transmitter electrodes 141, 142 connected to a power driver 150, and an insulating layer 160.

The transmitter electrodes 141, 142 are coupled to one side of the insulating layer 160 and the receiver electrodes 111, 112 are coupled from the other side of the insulating layer 160. This arrangement forms capacitive impedance between the pair of transmitter electrodes 141, 142 and the receiver electrodes 111, 112. Therefore, a power signal generated by the power driver can be wirelessly transferred from the transmitter electrodes 141, 142 to the receiver electrodes 111, 112 to power the load 120. Efficiency of the system is increased when a frequency of the power signal matches a series-resonance frequency of the system. The series-resonance frequency of the system 100 is a function of the inductive value of the inductor 130 and/or inductor 131 as well as of the capacitive impedance between the pair of transmitter electrodes 141, 142 and the receiver electrodes 111, 112 (C1 and C2 in FIG. 1). The load may be, for example, a LED, a LED string, a lamp, and the like. As an example, the system 100 can be utilized to power lighting fixtures installed on a wall.

The capacitance impedance (C1 and C2) is a function of the distance between the receiver electrodes and the transmitter electrodes. The capacitance value should be computed as followed:

$$C = \varepsilon \cdot \frac{A}{d}$$

where, A is the area of the receiver electrodes (shown as S1 and S2 in FIG. 1), d is the thickness of the insulating layer 160, and, $\in$ is the dielectric value of the dielectric.

The distance between the receiver and transmitter electrodes, and thus capacitance impedance can vary or can be varied, for example, when the surface of the insulation layer and/or the transmitter electrodes is not uniform (e.g., variable thickness across the insulation layer, curved, sloppy, or variable-shaped electrodes). In the capacitive wireless system 100, power is efficiently wirelessly transferred from the driver 150 to the load 120 when the frequency of the power signal substantially matches a series-resonance frequency of the system 100. Thus, fluctuations in the capacitance impedance would fluctuate the current flows through the load 120.

Therefore, it would be advantageous to structure receiver electrodes that would be aligned with the transmitter electrodes to ensure efficient power transfer in the capacitive power system.

Certain embodiments disclosed herein include an article of manufacture for supplying a power to a load connected in a capacitive power transfer system. The article of manufacture comprises a first conductive plate (212) connected to a first sphere-shaped hinge (211), wherein the first sphere-shaped hinge is coupled to a first receiver electrode (210); and a second conductive plate (222) connected to a second sphere-shaped hinge (221), wherein the first sphere-shaped hinge is coupled to a second receiver electrode (220), the second receiver electrode is connected to an inductor of the capacitive power transfer system and the first receiver electrode is connected to the load, the inductor is coupled to the load to resonate the capacitive power transfer system.

Certain embodiments disclosed herein also include an article of manufacture for supplying a power to a load connected in a capacitive power transfer system. The article of manufacture comprises a flexible pocket (330); a first receiver electrode (310) connected to the flexible pocket and connected to the load; and a second receiver electrode (320) connected to the flexible pocket and connected to an inductor of the capacitive power transfer system, the inductor is connected to the load to resonate the capacitive power transfer system.

Figure 9:
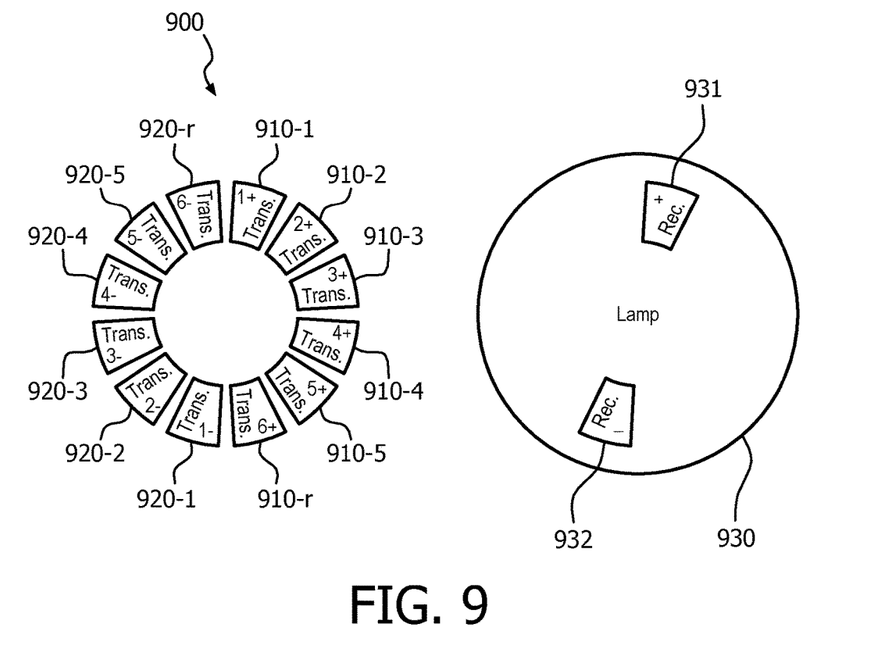

Certain embodiments disclosed herein also include a magnetic fixture 900 for mechanically fixing a receiver to a transmitter of a capacitive power transfer system. The magnetic fixture includes a first group of a plurality of transmitter electrodes (910-1, 910-r) including a plurality of permanent magnets having a first magnetic pole orientation, each of the transmitter electrodes of the first group of the plurality of transmitter electrodes having a first electric potential; a second group of a plurality of transmitter electrodes (920-1, 920-r) including a permanent magnet having a second magnetic pole orientation opposite to the first magnetic pole orientation, wherein each of the transmitter electrodes of the second group of the plurality of transmitter electrodes having electric potential opposite to the electric potential of each of the plurality of the plurality of transmitter electrodes; a first receiver electrode having the first electric potential and including a permanent magnet having the first magnetic pole orientation; and a second receiver electrode having the second electric potential and including a permanent magnet having the second magnetic pole orientation; wherein the first receiver electrode is orientated with one of the transmitter electrodes of the first group of the plurality of transmitter electrodes and the second receiver electrode is orientated with one of the transmitter electrodes of the second group of the plurality of transmitter electrodes, the receiver is mechanically fixed to the transmitter to allow a power signal to be wirelessly transferred from the transmitter to a load connected to the receiver.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
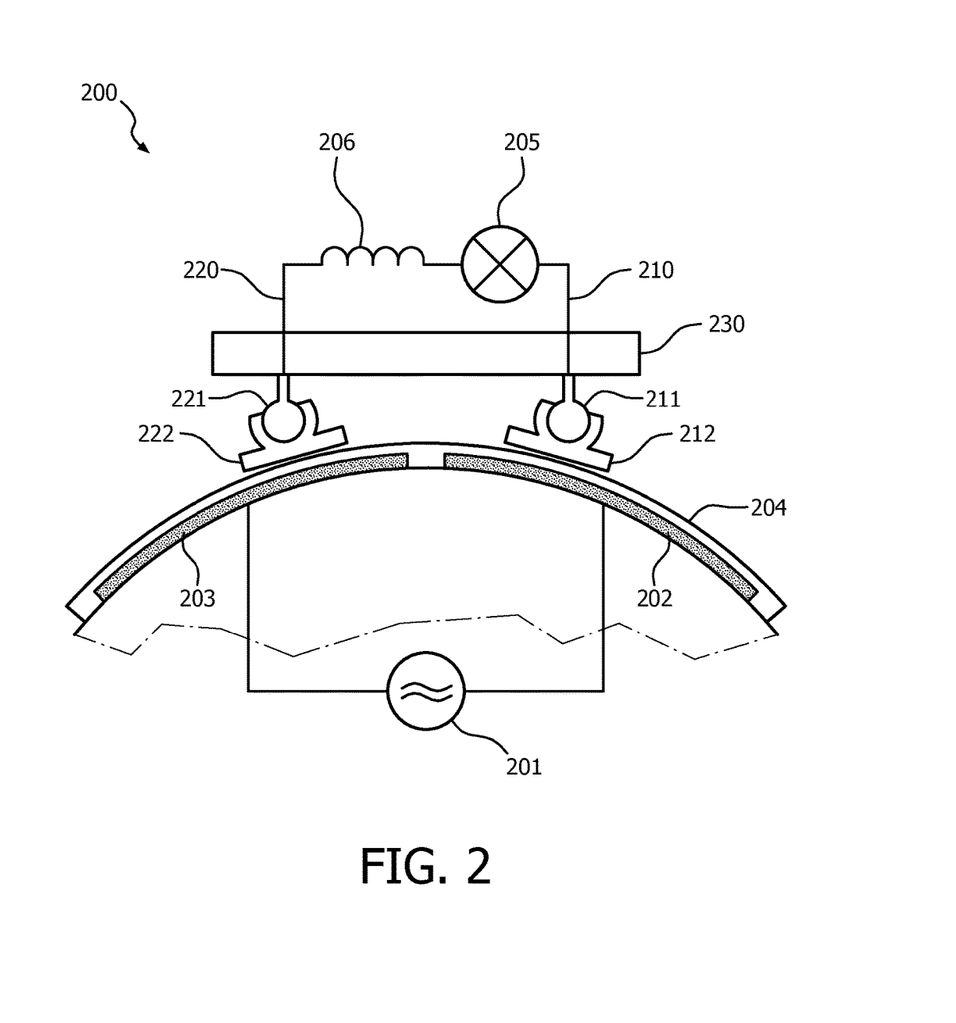
FIG. 2 is an illustration of an arrangement of receiver electrodes structured according to one embodiment.

FIG. 2 shows a schematic diagram of a pair of receiver electrodes 210 and 220 structured according to an embodiment of the invention. The receiver electrodes 210 and 220 are part of a capacitive powering system 200 operative as described in detail herein. The system 200 includes a power driver 201 connected to a pair of transmitter electrodes 202 and 203 covered by an insulation layer 204. The connection may be a galvanic or a capacitive coupling connection. On the receiver side, the receiver electrodes 210 and 220 are connected to a load 205 and an inductor 206, respectively.

As depicted in FIG. 2, the insulating layer 204 is a thin layer having a curved shape. The insulating layer 204 can be of any insulating material, including, for example, paper, wood, textile, glass, DI-water, and so on. In an embodiment, a material with dielectric permittivity is selected. The thickness of the insulating layer 204 is typically between 10 microns (e.g., a paint layer) and a few millimeters (e.g., a glass layer). The transmitter electrodes 202, 203 also have a curved shape to fit the structure of the insulating layer 204. The transmitter electrodes 202, 203 may be of any conductive material, such as carbon, aluminum, indium tin oxide (ITO), organic material, such as Poly(3,4-ethylenedioxythiophene) (PEDOT), copper, silver, conducting paint, or any conductive material.

To allow efficient power transfer the surface area of the transmitter electrodes substantially overlaps the surface area of the receiver electrodes to allow constant distance between the electrodes, whereby any fluctuations in the capacitive impedance and in the current flows through the load 205 are eliminated.

According to this embodiment, the receiver electrodes 210, 220 are shaped in such way as to overlap the surface area of the transmitter electrodes 202, 203. To this end, each of the receiver electrodes 210, 220 includes a conductive plate 212, 222 connected to a sphere-shaped hinge 211, 221, also made of a conductive material.

The conductive plates 212, 222 and sphere-shaped hinges 211, 221 can be of the same conductive material as the transmitter electrodes or made of different conductive material. Such material may include, for example, carbon, aluminum, indium tin oxide (ITO), organic material, conductive polymer, PEDOT, copper, silver, conducting paint, or any conductive material.

The structure of the receiver electrodes allows freedom in the movement of the conductive plates 212, 222 along the horizontal axis. Therefore, on any place along the insulation layer 204 the conductive plates substantially overlap the surface area of the transmitter electrodes 202, 203. Further, this structure advantageously provides for a substantially uniform gap between the transmitter and receiver electrodes, reducing the possibility of a large gap between the transmitter and receiver electrodes, thereby substantially ensuring that the capacitance is formed between them.

In one embodiment, the sphere-shaped hinges 211, 221 are realized as mechanical springs to allow movement of the conductive plates 212, 222 in the horizontal and vertical direction.

In yet another embodiment, the receiver electrodes are connected to a fixing means 230 to firmly fix the receiver device (including the electrodes 210, 220, load 205, and inductor 206) to an infrastructure (e.g., a wall, a window, etc.). The fixing means 230 may include, for example, a permanent magnet, a suction cap, a glue layer, and hook-and-loop tape, and the like. Various embodiments of a magnetic fixture are discussed below. When using glue as the fixing means, the glue layer serves as the insulating layer 204.

Figure 3A:
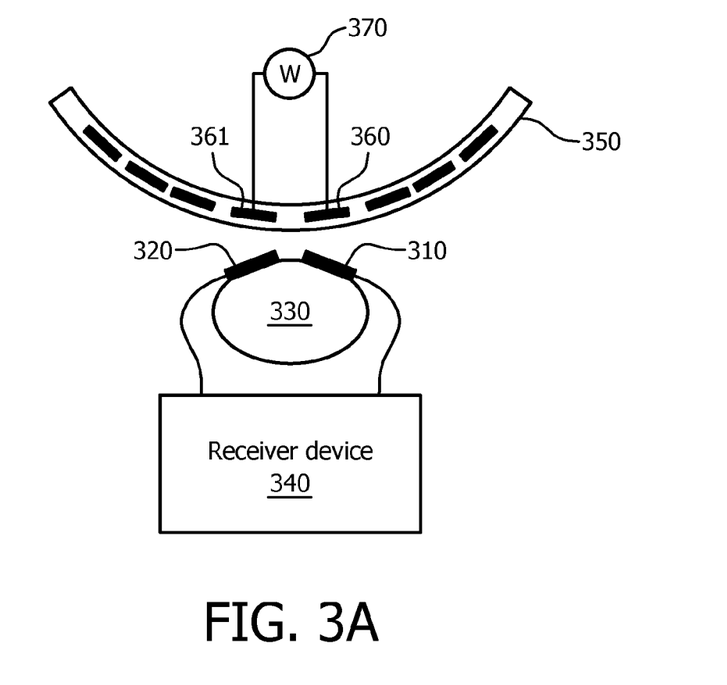
FIGS. 3A and 3B are illustrations of receiver electrodes structured as part of a flexible pocket according to one embodiment.
Figure 3B:
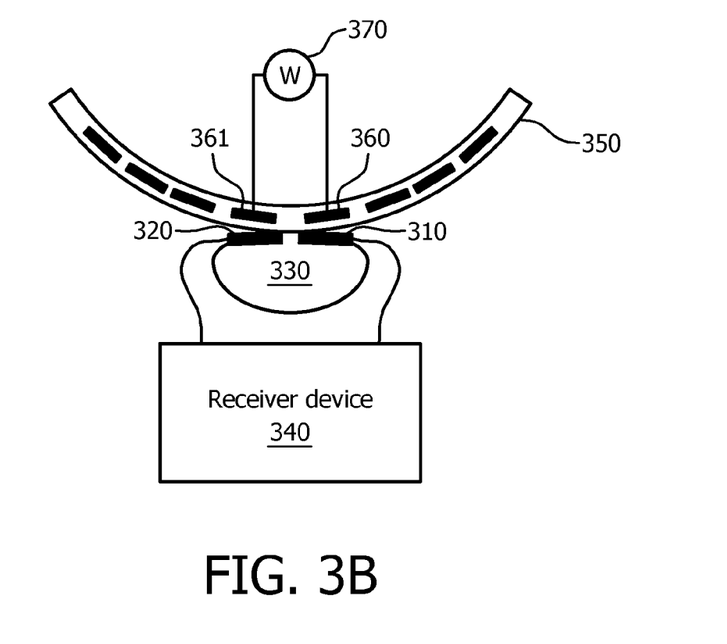

Another embodiment for structuring the receiver electrodes to easily and seamlessly adapt to a shape of the surface of the infrastructure (insulating layer and transmitter electrodes) is illustrated in FIGS. 3A and 3B. According to this embodiment, the receiver electrodes 310, 320 are fixed on the outside surface of a flexible pocket 330. The flexible pocket 330 may be any flexible container to enclose gas or liquid volume, for example, an inflated plastic bag or a balloon. The material of the flexible pocket 330 is a non-conductive material.

The material of the receiver electrodes 310, 320 may include any conductive material, such as those mentioned above. The electrodes 310, 320 are connected to the receiver device 340 that includes a load and an inductor (not shown in FIGS. 3A, 3B) as described in detail above.

To power the load in the receiver device 340, the flexible pocket is pressed against the insulation layer 350, as shown in FIG. 3B. As a result, transmitter electrodes 360, 361 connected to the insulation layer 350 are aligned with the receiver electrodes 310, 320. Consequently, the load in the receiver device 340 is wirelessly powered as discussed in detail above. The power signal is generated by a driver 370 connected to the transmitter electrodes 360, 361.

As depicted in FIGS. 3A and 3B multiple transmitter electrodes are placed along the curved-shape insulation layer 350. The design of the receiver electrodes 310, 320 provides that on every pair of transmitter electrodes 360, 361 the respective surface areas are substantially overlapped when the flexible pocket 330 is pressed against the insulation layer 350.

Figure 4A:
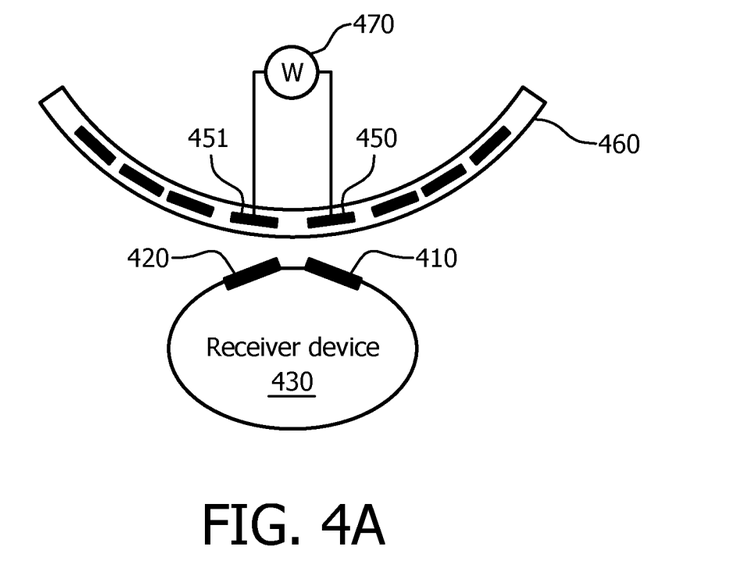
FIGS. 4A and 4B are illustrations of receiver electrodes structured as part of a flexible pocket according to one embodiment.
Figure 4B:
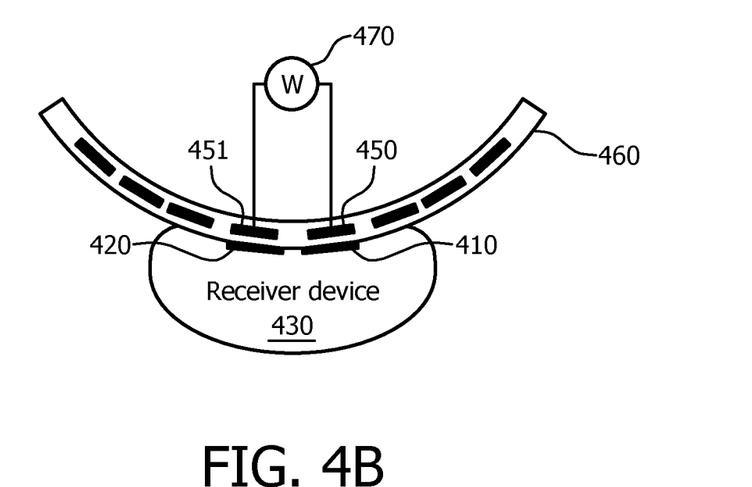

FIGS. 4A and 4B show another embodiment of the receiver electrodes 410, 420 connected inside a flexible pocket 430. Such a design can be used when the receiver electrodes 410, 420 are to be isolated from the environment, for instance, for hygienic reasons. In a certain configuration, a receiver device which includes a load and an inductor (not shown in FIGS. 4A and 4B) may also be placed inside the flexible pocket 430. The flexible pocket 430 is made of a non-conductive material. The receiver electrodes 410, 420 can be made using any of the conductive material mentioned above.

The capacitive impedance is created between the receiver electrodes 410, 420 and transmitter electrodes 450,451, when the receiver and transmitter electrodes are in alignment. With this aim, as shown in 4B, when the flexible pocket 430 is pressed against an insulation layer 460, the receiver electrodes are deformed to be in alignment with the transmitter electrodes 450,451. At this position, the load in the receiver device is wirelessly powered as discussed in detail above. The power signal is generated by a driver 470 connected to the transmitter electrodes 450, 451.

Figure 5:
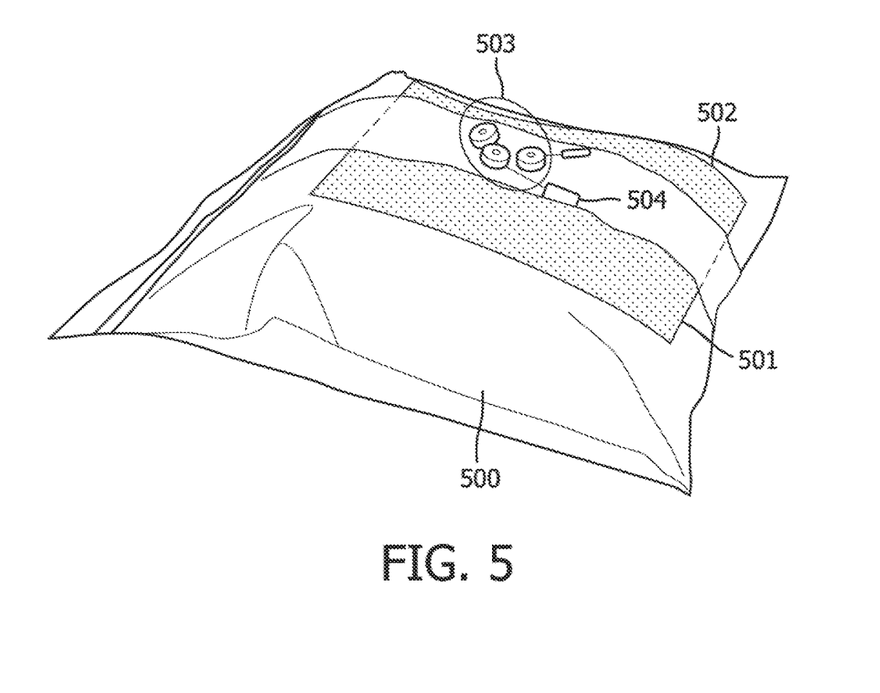
FIG. 5 is a picture exemplifying a practicable application of the flexible pocket receiver.

FIG. 5 shows a practical application of a flexible pocket 500 according to one embodiment. The flexible pocket 500 is an inflated plastic bag having a pair of receiver electrodes 501 and 502 realized as two copper strips adhered on the plastic bag. The flexible pocket 500 is a complete receiver device including a LED lamp (load) 503 and an inductor 504. The flexible pocket 500 may be any shape (e.g., shaped as an action figure toy) or any color. Thus, the embodiments of the flexible pocket can be utilized as a night lamp, an outdoor light fixture, and so on.

In one embodiment, the flexible pockets disclosed herein include a fixing means to secure the receiver device to the surface of the insulating layer. The fixing means may include, for example, a permanent magnet, a suction cap, a glue layer, and the like. In the embodiment of permanent magnets, the surface of the insulating layer may include a soft-magnetic material, such as iron orferrite paint. The flexible pocket is attracted to the surface by one or more magnets. The magnets may be adhered to the outside or the inside layer of the flexible pocket, but are not in direct contact with the receiver electrodes. In a preferred embodiment, the magnets are arranged behind the electrodes of the pocket inside the device. The magnets of the flexible pocket may include solid blocks or a powdered magnetic material mixed in flexible polymer.

In another embodiment, one or more suction caps are utilized as the fixing means to attach the flexible pocket to the surface of the insulation layer. To this end, the surface should be very smooth to allow the suction cap to maintain vacuum with the surface. The suction cap may be arranged beside the receiver electrodes of the pocket device.

It should be noted that with respect to the embodiments described with reference to FIGS. 3, 4, and 5, the system is a capacitive power system in which the load (e.g., a lamp) is wirelessly powered when the frequency of the power signal substantially matches the series-resonance frequency related to the capacitance impedance formed between the electrodes and the inductor connected to the load. Thus, for example, the embodiments disclosed herein can be utilized to power a lamp fixed to a wall without wires or power outlets.

For aesthetical reasons it may be desired to connect the receiver device to a large surface, such as a wall or a window without any mechanical means, such as screws and nails. Accordingly, various embodiments disclosed herein include a magnetic fixture utilized in a capacitive wireless power system.

Figure 6:
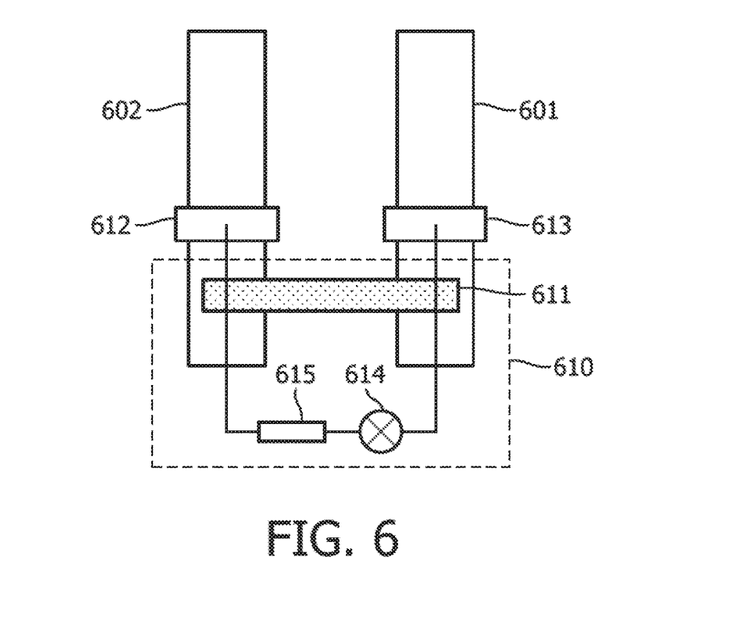
FIGS. 6, 7, 8 and 9 are diagrams of various magnetic fixtures structured according to various embodiments.

In one embodiment, shown in FIG. 6, transmitter electrodes 601, 602 are stripes made from paramagnetic and conductive material and are connected to an infrastructure, e.g., a wall. For example, each of the electrodes 601, 602 may be an iron metal sheet with a thickness of about 0.5 mm to 1 mm. A receiver device 610 includes one permanent magnet 611 which is attracted to the transmitter electrodes 601 and 602, thus magnetically fixing the receiver device 610 to the infrastructure.

The receiver device 610 further comprises electrodes 612, 613 that when the magnet 611 and transmitter electrodes 601, 602 are in contact, the receiver electrodes 612, 613 are at a close distance to the transmitter electrodes 601, 602 (but do not touch each other as there is an insulation layer between them). At this position, a load 614 connected to an inductor 615 is wirelessly powered as discussed in detail above. The power signal is generated by a driver (not shown) connected to the transmitter electrodes 601 and 602. Thus, the air or the finishing layer of a wall (e.g. wallpaper, foil or paint) can serve as the insulation layer. When air is the insulation layer, spacers are used between the transmitter and receiver electrodes to prevent them from making galvanic contact. In this embodiment, the receiver electrodes 612, 613 are made of conductive and non-magnetic material, such as copper or of any of the organic material mentioned above.

In another embodiment, the receiver device includes at least two magnets. The magnets are covered with a thin electric conducting layer to form the receiver electrodes. The conductive layer can be made from a tin metal sheet and adhered to the magnets. Alternatively, the magnets can be covered with metal material by a deposition process, e.g., galvanic deposition.

In this embodiment, the receiver electrodes are magnetically attracted to the transmitter electrodes, thereby magnetically fixing the receiver device to the infrastructure (e.g., wall). The transmitter electrodes may be of any shape installed behind a decorative cover.

Figure 7:
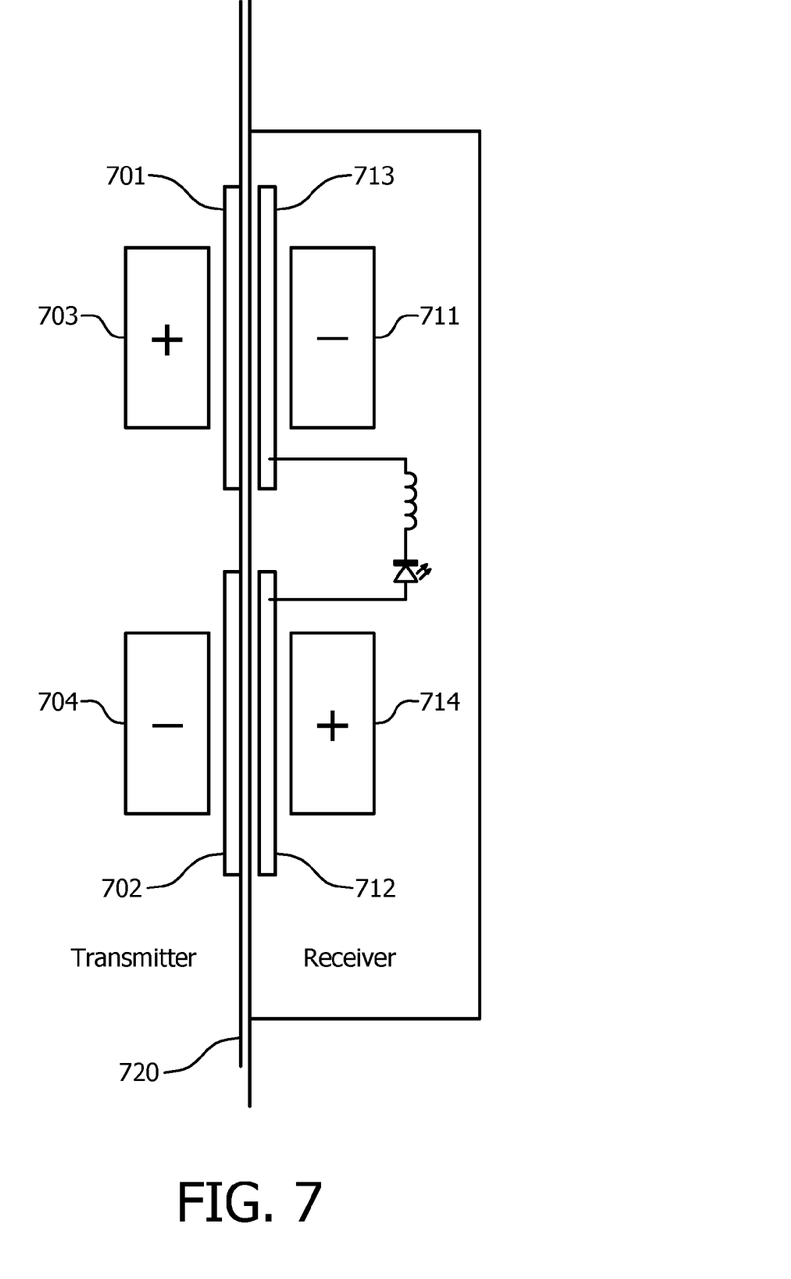

FIG. 7 is a cross-section diagram of a magnetic fixture according to another embodiment. A transmitter device includes permanent magnets 703, 704 installed in the back of the transmitter electrodes 701, 702. The magnet 703 is oriented in a first magnetic pole, while the magnet 702 is oriented in the opposite magnetic pole of the first transmitter electrode 702.

In the receiver device, a first receiver electrode 713 includes a permanent magnet 711 in a direction such that it is attracted by the magnet 703 associated with the first transmitter electrode 701. That is, the magnetic orientation of the magnet 711 is opposite to that of the magnet 703. The second receiver electrode 712 comprises a magnet 714 such that is attracted to the magnet 704 of the second transmitter electrode 702. As a result, the receiver device can be fixed to the infrastructure only when the device is in the correct orientation, thereby ensuring proper electrical connections. It should be noted that when the receiver device is mechanically fixed to the transmitter device by magnetic force, there is no direct electrical contact between them, as the receiver electrodes 712, 713 and the transmitter electrodes 701, 702 are separated by an insulating layer 720. The insulating layer 720 may be air, a paint layer, a wall paper, and the like. The '+' and '−' labels in FIG. 7 indicate the magnetic orientation.

Figure 8:
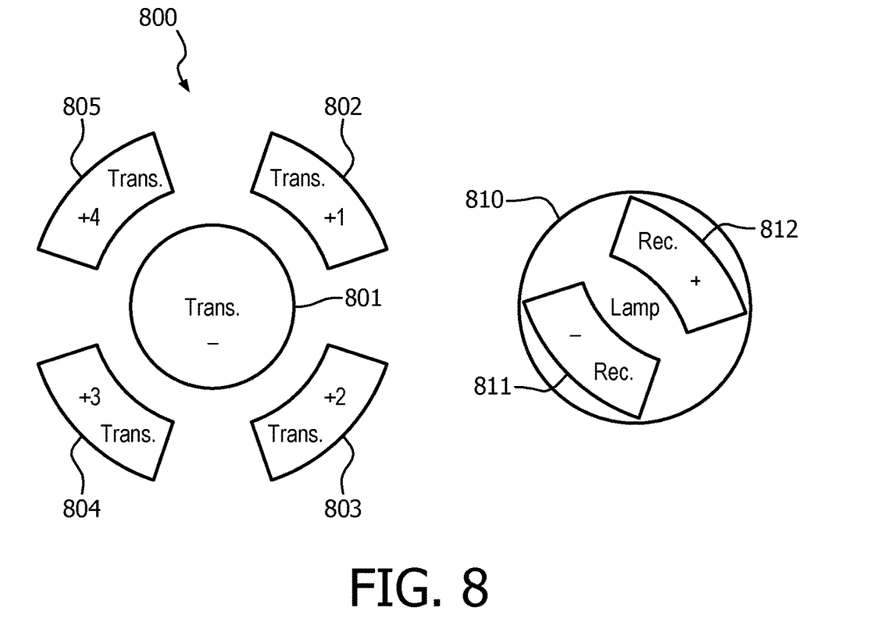

In yet another embodiment, a transmitter device includes permanent magnets associated with the transmitter electrodes. For example, a transmitter electrode can be placed in front of a permanent magnet. The transmitter electrodes associated with the permanent magnets may be of different potential or phase shift. As shown in FIG. 8, a reference electrode 801 associated with a permanent magnet (not shown) oriented in a first magnetic pole is arranged in the center of a circle. Around the reference electrode, a number of adjacent transmitter electrodes 802, 803, 804, and 805 are arranged, where each of them is being associated with a permanent magnet (not shown) oriented in a second magnetic pole being opposite to the first magnetic pole. Each of the adjacent transmitter electrodes 802 to 805 has a different electrical potential compared to the reference electrode 801. According to this embodiment, a receiver device 810 can then be placed with one receiver electrode 811 on the reference transmitter electrode 801 and with the other receiver electrode 812 on one of the adjacent electrodes 802 to 805. Each of the receiver electrodes 811, 812 may be placed in front of a permanent magnet (not shown in FIG. 8).

It should be noted that as each pair of transmitter electrodes has a different potential, the placement of the receiver electrodes respective of the transmitter electrodes determines the amount of power to be transmitted. This allows tuning the power level by selecting a different potential. For example, this can be utilized to dim the light illuminated by a lamp in the receiver device 810. It should be further noted that when the receiver device 810 is mechanically fixed to the transmitter device 800 by magnetic force, there is a no direct electric contact between them, as they are separated by an insulating layer. The '+' and '−' labels in FIG. 8 indicate the magnetic orientation.

In another arrangement, depicted in FIG. 9, a number of first transmitter electrodes 910-1 through 910-r are arranged in a half circle, and a number of second transmitter electrodes 920-1 through 920-r are also arranged in a half circle, such that both half circles combine to form a circle. Each of the electrodes 910-1 through 910-r and 920-1 through 920-r has a different electric potential, such that by turning a receiver device 930, a different power level can be selected. In addition, the first group of transmitter electrodes 910-1 through 910-r and second group of transmitter electrodes 920-1 through 920-r are associated with a different magnetic pole. The '+' and '−' labels in FIG. 9 indicate the magnetic orientation.

According to this embodiment, one receiver electrode 931 of the receiver device 930 can then be aligned with one of the first transmitter electrodes 910-1 through 910-r, while the second receiver electrode 932 is aligned with the second transmitter electrodes 920-1 through 920-r. In a different exemplary arrangement, the receiver and transmitter electrodes with different potential are arranged in two parallel rows.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An article of manufacture for supplying a power to a load connected in a capacitive power transfer system, comprising:
   a flexible pocket having a flexible surface;
   a first receiver electrode being fixed directly to the flexible surface of the flexible pocket and connected to the load; and
   a second receiver electrode being fixed directly to the flexible surface of the flexible pocket, such that the relative orientation of the first receiver electrode and second receiver electrode, with respect to each other, is adjustable, and connected in series to an inductor of the capacitive power transfer system, wherein the inductor is connected in series to the load and configured to resonate at a series-resonance frequency of the capacitive power transfer system.

2. The article of manufacture of claim 1, wherein a power signal generated by a power driver is wirelessly transferred from a pair of transmitter electrodes coupled to an insulating layer to the first and second receiver electrodes to wirelessly power the load when a frequency of the power signal substantially matches a series-resonance frequency of the inductor and the capacitive impedance formed between the pair of transmitter electrodes and the receiver electrodes when the flexible pocket is pressed against the insulating layer, wherein each of the pair of transmitter electrodes and the insulating layer has a curved shape.

3. The article of manufacture of claim 2, wherein each of the first and second receiver electrodes substantially overlaps the surface of a transmitter electrode of the pair of transmitter electrodes, such that fluctuations in the capacitance impedance are reduced.

4. The article of manufacture of claim 1, wherein the flexible pocket is a flexible container configured to seal a gas volume or liquid volume, wherein the flexible container is made of a non-conductive material.

5. The article of manufacture of claim 1, wherein the first and second receiver electrodes are adhered to an outside of the flexible pocket.

6. The article of manufacture of claim 1, wherein the first and second receiver electrodes are adhered to an inside of the flexible pocket.

7. The article of manufacture of claim 2, wherein the flexible pocket further includes a fixing means to secure the flexible pocket to the surface of the insulating layer, wherein the fixing means include any one of: a permanent magnet, a suction cap, and a glue layer.

8. An article of manufacture for supplying a power to a load connected in a capacitive power transfer system, comprising:
- a flexible pocket;
- a first receiver electrode connected to the flexible pocket and connected to the load; and
- a second receiver electrode connected to the flexible pocket, and connected in series to an inductor of the capacitive power transfer system, wherein the inductor is connected in series to the load and configured to resonate at a series-resonance frequency of the capacitive power transfer system, wherein the flexible pocket is a flexible container configured to seal a gas volume or liquid volume, wherein the flexible container is made of a non-conductive material.

9. The article of manufacture of claim 8, wherein a power signal generated by a power driver is wirelessly transferred from a pair of transmitter electrodes coupled to an insulating layer to the first and second receiver electrodes to wirelessly power the load when a frequency of the power signal substantially matches a series-resonance frequency of the inductor and the capacitive impedance formed between the pair of transmitter electrodes and the receiver electrodes when the flexible pocket is pressed against the insulating layer, wherein each of the pair of transmitter electrodes and the insulating layer has a curved shape.

10. The article of manufacture of claim 9, wherein each of the first and second receiver electrodes substantially overlaps the surface of a transmitter electrode of the pair of transmitter electrodes, such that fluctuations in the capacitance impedance are reduced.

11. The article of manufacture of claim 8, wherein the first and second receiver electrodes are adhered to an outside of the flexible pocket.

12. The article of manufacture of claim 8, wherein the first and second receiver electrodes are adhered to an inside of the flexible pocket.

* * * * *